US012421091B1

(12) United States Patent
Hamlik et al.

(10) Patent No.: US 12,421,091 B1
(45) Date of Patent: *Sep. 23, 2025

(54) SINGLE—DOUBLE LOAD CLAMP

(71) Applicant: Rightline Equipment, Inc., Rainer, OR (US)

(72) Inventors: Jim D. Hamlik, Vancouver, WA (US); Joel D. Hamlik, Vancouver, WA (US); Kevin Sandison, Vancouver, WA (US)

(73) Assignee: Rightline Equipment, Inc., Rainer, OR (US)

(*) Notice: Subject to any disclaimer, the term of this patent is extended or adjusted under 35 U.S.C. 154(b) by 961 days.

This patent is subject to a terminal disclaimer.

(21) Appl. No.: 17/535,563

(22) Filed: Nov. 24, 2021

Related U.S. Application Data

(60) Provisional application No. 63/117,944, filed on Nov. 24, 2020.

(51) Int. Cl.
*B66F 9/18* (2006.01)
*B66F 9/14* (2006.01)
*B66F 9/20* (2006.01)

(52) U.S. Cl.
CPC .............. *B66F 9/183* (2013.01); *B66F 9/141* (2013.01); *B66F 9/20* (2013.01)

(58) Field of Classification Search
CPC ............. B66F 9/183; B66F 9/141; B66F 9/20
See application file for complete search history.

(56) References Cited

U.S. PATENT DOCUMENTS

| | | | | |
|---|---|---|---|---|
| 2,509,023 | A | 5/1950 | Vogel | |
| 3,370,880 | A | 2/1968 | Carliss | |
| 3,433,376 | A | 3/1969 | Jordan | |
| 3,450,288 | A | 6/1969 | Walsh | |
| 3,643,827 | A | 2/1972 | Link | |
| 4,381,166 | A | 4/1983 | Smart | |
| 5,707,201 | A | 1/1998 | Hamlik | |
| 5,807,060 | A * | 9/1998 | Hamlik | B66F 9/148 91/367 |
| 7,118,148 | B1 | 10/2006 | Davis | |
| 7,588,409 | B2 * | 9/2009 | Foroni | B66F 9/148 414/667 |
| 7,909,563 | B2 * | 3/2011 | Prentice | B66F 9/143 414/667 |
| 7,926,247 | B2 * | 4/2011 | Van Den Engel | A01B 63/32 56/15.9 |
| 8,016,334 | B2 | 9/2011 | Garrett | |

(Continued)

*Primary Examiner* — Stephen A Vu

(74) *Attorney, Agent, or Firm* — Rylander & Associates, PC; Philip R. M. Hunt

(57) ABSTRACT

A single-double load clamp load handler is provided for a lift truck. The load handler includes a frame, a first, a second and a third clamp arms, each with a clamp plate, and each with a sliding beam slidingly coupled to the frame. The first clamp arm sliding beam has an inner sliding beam stop and an outer sliding beam stop. The third clamp arm sliding beam has a center sliding beam stop. The inner sliding beam stop is configured for contacting the center sliding beam stop then pulling the third clamp arm away from the second clamp arm when the first clamp arm moves away from the second clamp arm. The outer sliding beam stop is configured for contacting the center sliding beam stop then pushing the third clamp arm toward the second clamp arm when the first clamp arm moves toward the second clamp arm.

23 Claims, 6 Drawing Sheets

(56) References Cited

U.S. PATENT DOCUMENTS

| | | | | |
|---|---|---|---|---|
| 8,517,440 | B1 | 8/2013 | Dosso | |
| 8,585,344 | B2 * | 11/2013 | Sharp | B66F 9/142<br>414/667 |
| 9,321,619 | B2 | 4/2016 | Wang | |
| 10,179,724 | B2 | 1/2019 | Kaup | |
| 10,207,907 | B1 | 2/2019 | Hamlik | |
| 10,280,056 | B1 | 5/2019 | Davis | |
| 10,377,617 | B2 | 8/2019 | Schindlbeck | |
| 10,589,970 | B1 | 3/2020 | Hamlik | |
| 11,220,416 | B1 | 1/2022 | Hamlik | |
| 11,370,644 | B1 | 6/2022 | Hamlik | |
| 11,608,256 | B1 | 3/2023 | Hamlik | |
| 11,878,900 | B1 | 1/2024 | Hamlik | |
| 12,006,197 | B1 | 6/2024 | Hamlik | |
| 12,180,051 | B1 * | 12/2024 | Hamlik | B66F 9/183 |
| 2008/0063503 | A1 | 3/2008 | Garrett | |
| 2016/0152455 | A1 | 6/2016 | Hamlik | |
| 2018/0155168 | A1 | 6/2018 | Hamlik | |
| 2018/0222734 | A1 | 8/2018 | Bovo | |
| 2019/0210851 | A1 | 7/2019 | Hamlik | |
| 2019/0337781 | A1 | 11/2019 | Schlott | |
| 2022/0063973 | A1 | 3/2022 | Hamlik | |
| 2023/0136144 | A1 | 5/2023 | Hamlik | |

* cited by examiner

SINGLE—DOUBLE LOAD CLAMP

CROSS-REFERENCE TO RELATED APPLICATIONS

This application claims the benefit of U.S. Provisional Application No. 63/117,944, filed 2020 Nov. 24, incorporated herein by reference.

FIELD OF THE INVENTION

The present invention relates to cargo handling equipment. More particularly, the present invention relates to carton clamps for use primarily with lift trucks.

BACKGROUND

Material handling vehicles such as lift trucks are used to pick up and deliver loads between stations. A typical lift truck 10 has a mast 12, which supports a load-lifting carriage 14 that can be raised along the mast 12 (see FIG. 1). The carriage 14 typically has one or more carriage bars 16 to which a fork frame 18 is mounted. The carriage bars 16 are coupled to the mast in a way that allows the lift truck 10 to move the carriage bars 16 up and down, but not laterally relative to the truck. The fork frame 18 carries a pair of forks 20. An operator of the lift truck 10 maneuvers the forks 20 beneath a load prior to lifting it.

Instead of forks 20, a lift truck 10 may have a load clamp assembly 32 coupled to its mast 12 (See FIG. 2). The load clamp assembly 32 typically comprises a frame 40, one or more actuators 36 and two clamp arms 34. The actuators 36 are configured to move the clamp arms 34 toward or away from each other with actuator rods 38. The clamp arms 34 typically have a gripping material on the inside surfaces that contact the load. The gripping material, such as rubber or polyurethane, provides high friction contact surface for gripping the load and also provides a compressible and resilient contact surface to protect the load from superficial damage from the clamp arms 34. In use, the operator of the lift truck 10 approaches a load to be carried, such as a stack of cartons or a large appliance, such as a refrigerator. As the lift truck 10 approaches the load, the operator uses controls to open the gap between the clamp arms 34 wider than the load and may adjust the height of the clamp arms 34 so they will engage the load in a suitable location. The operator then maneuvers the lift truck 10 to straddle the load between the clamp arms 34. When the clamp arms 34 are positioned suitably around the load, the operator uses controls to bring the clamp arms 34 together, grasping the load. The operator then uses other controls to raise the load clamp assembly 32, raising the load off the floor, the load held between the clamp arms 34 by friction. The operator then drives the load to a desired location.

Load clamps, also known as carton clamps, are well known, but existing designs are designed for the lift truck 10 primarily for lifting a single carton. Typically, they approach a load with the clamp arms 34 spread wider than the load, maneuver so that the load is between the clamp arms 34 and then close the clamp arms 34 until they grasp the load. Then the load can be lifted and moved. However, the standard carton clamp design makes it problematic for the clamps to grasp two separate items or two separate stacks of items such as stacks of cartons, bales, or tires. If the items in the two stacks are not rectangular objects, clamping force is not likely to be transmitted from one stack to the other without inducing torque and rotation in one or more of the load objects, potentially twisting the objects off the stack.

BRIEF DESCRIPTION OF THE DRAWINGS

The present invention will be described by way of representative embodiments, illustrated in the accompanying drawings in which like references denote similar elements, and in which.

DETAILED DESCRIPTION

Before beginning a detailed description of the subject invention, mention of the following is in order. When appropriate, like reference materials and characters are used to designate identical, corresponding, or similar components in different figures.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming but would nevertheless be a routine undertaking of engineering for those of ordinary skill in the art having the benefit of this disclosure.

Use of directional terms such as "upper," "lower," "above," "below", "in front of," "behind," etc. are intended to describe the positions and/or orientations of various components of the invention relative to one another as shown in the various Figures and are not intended to impose limitations on any position and/or orientation of any embodiment of the invention relative to any reference point external to the reference. Herein, "left" and "right" are from the perspective of an operator in a lift truck. Herein, "lateral" refers to directions to the left or the right and "longitudinal" refers to a direction perpendicular to the lateral direction and to a plane defined by the fork frame.

Those skilled in the art will recognize that numerous modifications and changes may be made to the various embodiments without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function, or property of the first embodiment is essential. Other embodiments are possible, their specific designs depending upon the particular application. As such, the scope of the invention should not be limited by the particular embodiments herein described but should be defined only by the appended claims and equivalents thereof.

REPRESENTATIVE EMBODIMENT—STRUCTURE

Figure 1:
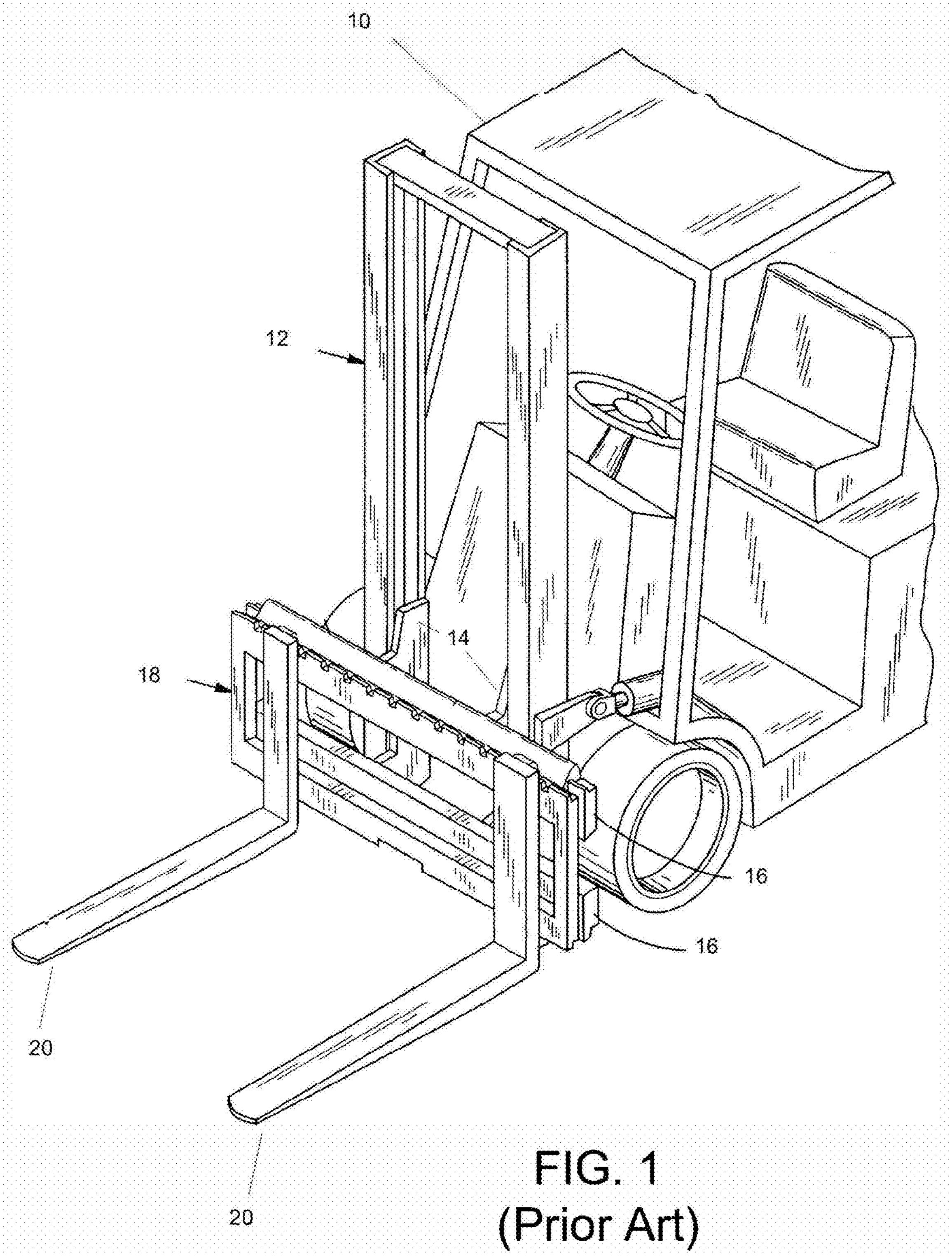
FIG. 1 (Prior Art)
FIG. 1 is an isometric view of a prior art lift truck, illustrating typical components of a lift truck equipped with forks.
Figure 2:
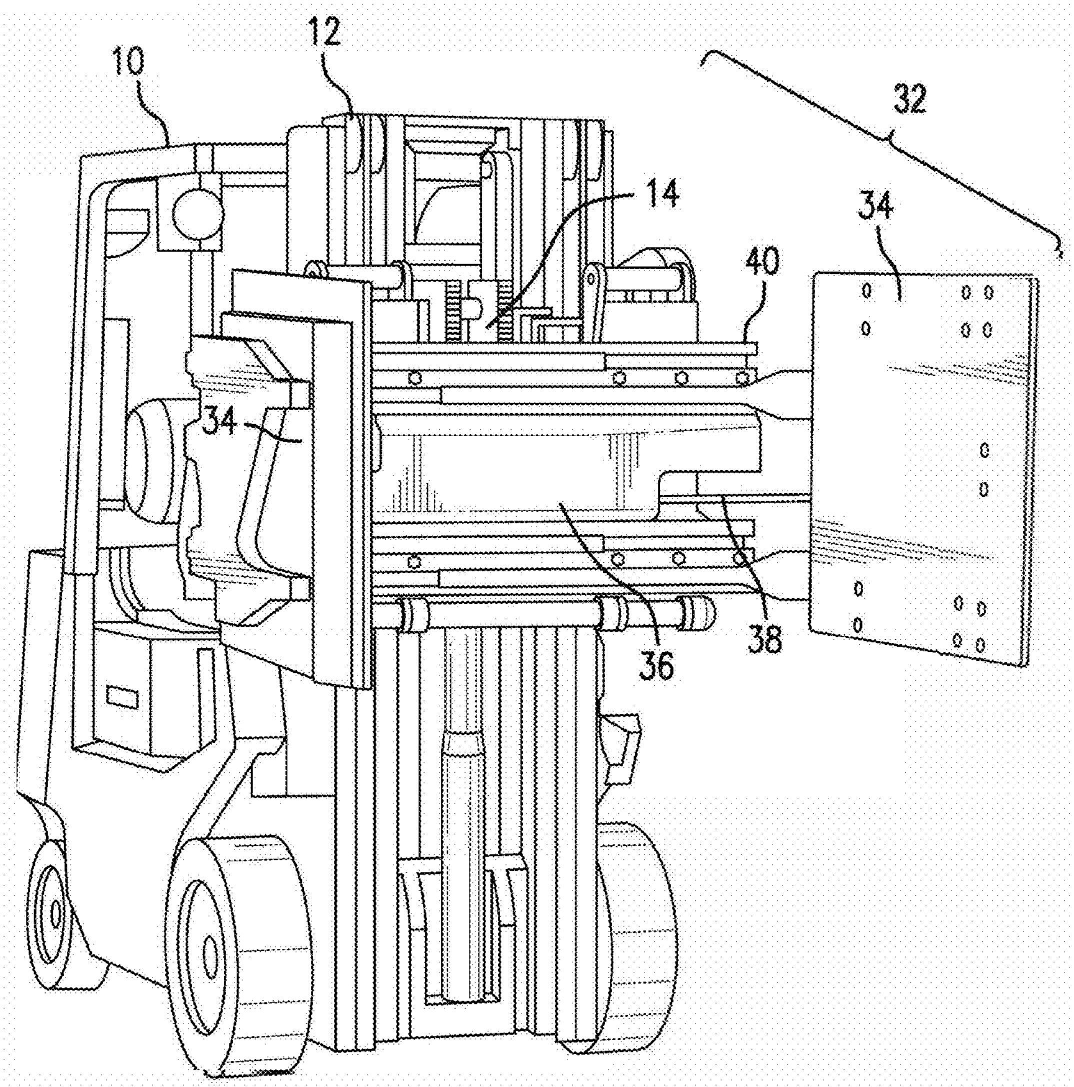
FIG. 2 (Prior Art)
FIG. 2 is an isometric view of a prior art lift truck, illustrating typical components of a lift truck equipped with a load clamp assembly.
Figure 3:
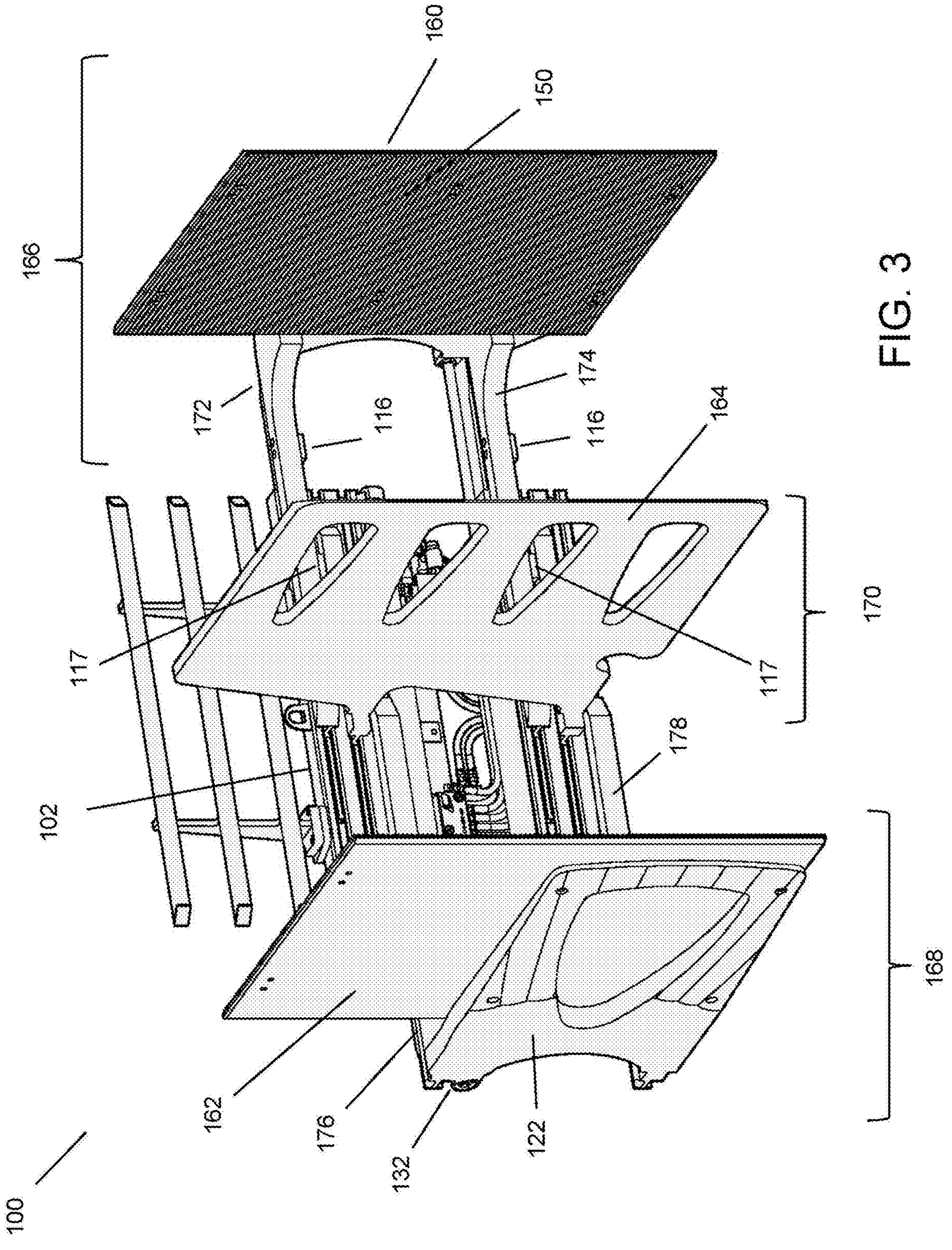
FIG. 3 is a front right isometric view of a representative embodiment single-double load clamp 100.
Figures 4A, 4B:
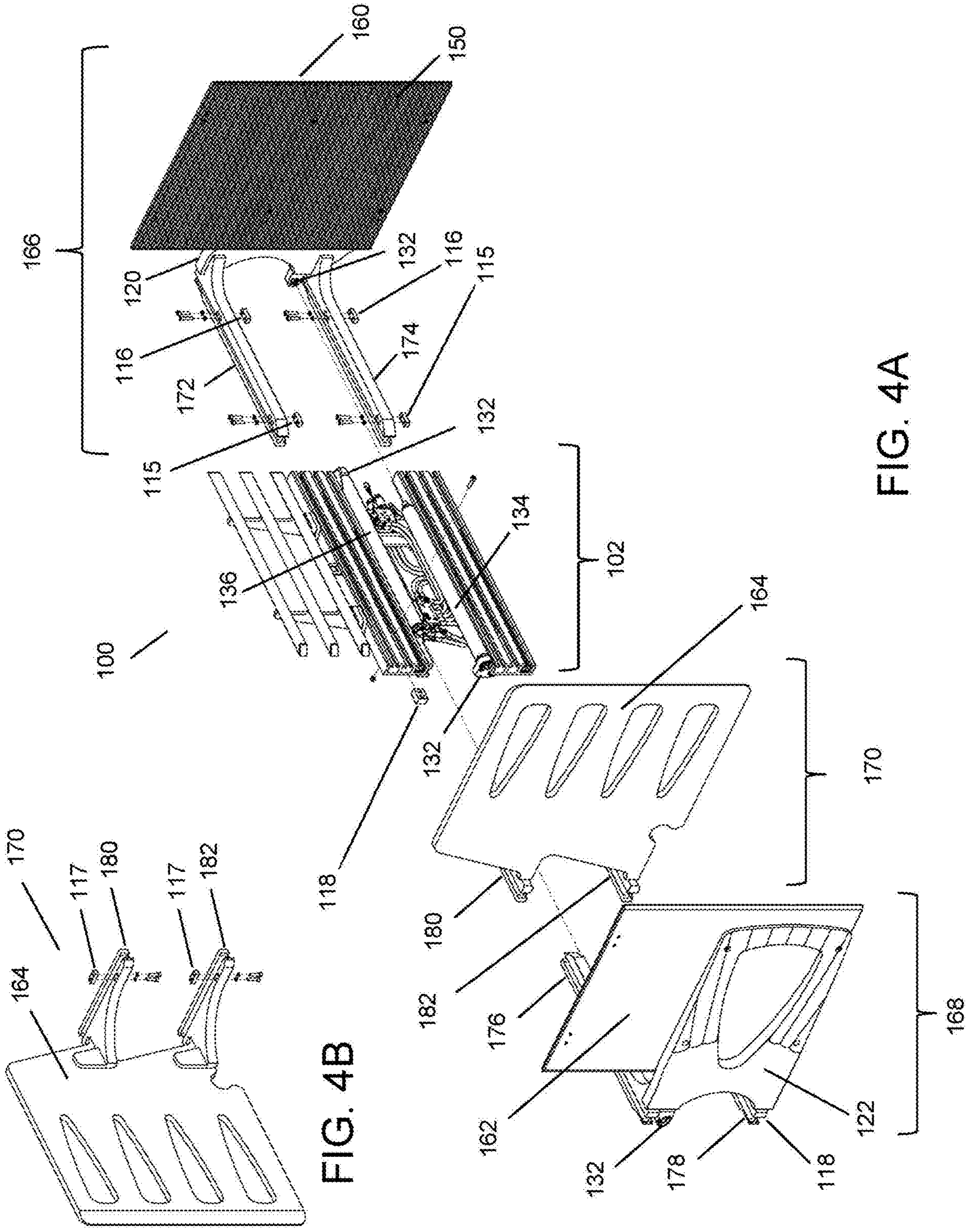
FIG. 4A is an exploded front right isometric view of the representative embodiment single-double load clamp 100.
FIG. 4B is front left isometric detailed view of a center clamp arm 170 from FIG. 4A.

FIG. 3 shows a front right isometric view of a representative embodiment single-double load clamp 100. FIG. 4A shows an exploded front right isometric view of the representative embodiment single-double load clamp 100. FIG. 4B is front right isometric detailed view of a center clamp arm 170 from FIG. 4A. The single-double load clamp 100 comprises a frame 102, a first (left) clamp arm 166, a second (right) clamp arm 168, a third (center) clamp arm 170. The frame 102 is configured to be coupled to a carriage 14 of a lift truck 10. In the representative embodiment single-double load clamp 100, the first clamp arm 166 is on the left (viewed from the driver's perspective) and the second clamp arm 168 is on the right. The single-double load clamp 100 has a first clamp actuator 134 is attached to the frame 102 and to the first (left) clamp arm 166. The single-double load clamp 100 has second clamp actuator 136 is attached to the frame 102 and to the second (right) clamp arm 168. Each actuator 134, 136 is configured to pull its respective clamp arm 166, 168 toward the other or push it away from the other. In some alternative embodiments, the actuators 134, 136 are further configured to act in tandem to provide a small amount of side shift to the clamp arms 166, 168, allowing an operator approaching a load with a lift truck 10 to make a small adjustment lateral of the left and right clamp arms 166, 168 if the lift truck 10 is not perfectly lined up with the load. In the single-double load clamp 100 the side shift function is primarily provided by a separate side-shift actuator (not shown) that moves the frame 102 laterally relative to the carriage 14. In some alternative embodiments, the first clamp arm 166 is configured to move when in a single mode of operation, but the second clamp arm 168 is configured to remain stationary.

Figure 5:
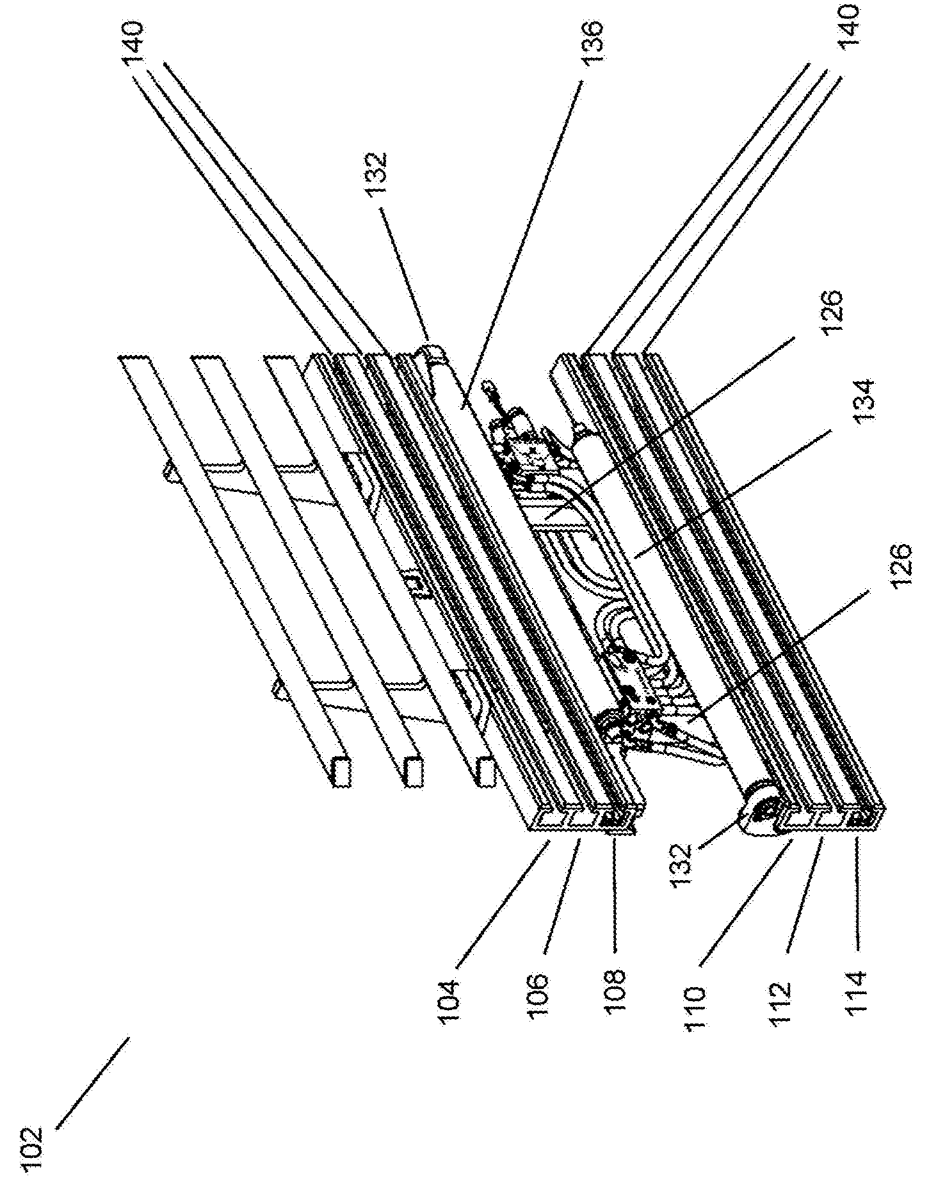
FIG. 5 is a front right isometric view of a frame 102 of a representative embodiment single-double load clamp 100.

As shown in FIG. 5, the frame 102 comprises three upper guide channels (104, 106, 108) and three lower guide channels (110, 112, 114) coupled to two frame vertical beams 126. A first guide channel 104 is positioned near a top of the frame 102, with a second guide channel 106 below and a third guide channel 108 below that. A sixth guide channel 114 is positioned near the bottom of the frame 102 with a fifth guide channel 112 above and a fourth guide channel 110 above that. The frame 102 has a gap between the upper guide channels (104, 106, 108) and the lower guide channels (110, 112, 114). In the representative embodiment single-double load clamp 100, the upper guide channels (104, 106, 108) are in contact with each other and the lower guide channels (110, 112, 114) are in contact with each other. In some embodiments, some of the upper guide channels (104, 106, 108) share common walls and in some embodiments and some of the lower guide channels (110, 112, 114) share common walls. However, in other embodiments, the upper guide channels (104, 106, 108) and the lower guide channels (110, 112, 114) do not all have common walls. The frame 102 has two actuator brackets 132, one actuator bracket 132 coupled to a bottom of the third guide channel 108 on the left and coupled to the second clamp actuator 136, and the other actuator bracket 132 coupled to a top of the fourth guide channel 110 on the right and coupled to the first clamp actuator 134. The single-double load clamp 100 is in a closed configuration when the left and right clamp arms 166, 168 are as close together as the actuators 134, 136 can pull them. The single-double load clamp 100 is in an open configuration when the left and right clamp arms 166, 168 are as far apart as the actuators 134, 136 can push them.

Each of the guide channels (104, 106, 108, 110, 112, 114) has a guide channel cavity, open at the ends. Each of the guide channels (104, 106, 108, 110, 112, 114) has a guide slot 140 on the front, opening to the guide channel cavity. Each of the guide channels (104, 106, 108, 110, 112, 114) has a channel bearing, positioned inside the guide channel cavity, and shaped to conform thereto, and with its own interior cavity that is similarly shaped, but slightly smaller. Each channel bearing is detachably coupled to its respective guide channel (104, 106, 108, 110, 112, 114). In the first exemplary embodiment, each channel bearing is detachably coupled to its respective guide channel (104, 106, 108, 110, 112, 114) with a removable fastener scheme such as cap screws and nuts, but in other embodiments, other fastening schemes may be used. The channel bearings comprise suitable bearing material that provides low friction and are softer than the components with which they have sliding contact in order to preferentially wear. Since the channel bearings are removable, they can be easily replaced when worn down.

The frame 102 has a guide channel stop 118 coupled inside and coupled to the second (upper middle) guide channel 106 for limiting the motion of the third (center) clamp arm 170. In other embodiments, the frame 102 has additional guide channel stop 118 coupled inside and to a different one of the guide channels (104, 108, 110, 112, 114), one that the fifth sliding beam 180 or the sixth sliding beam 182 is configured to insert into.

The first (left) clamp arm 166 comprises a first (left) clamp plate 160 coupled via a first (left) clamp arm bracket 120 to a first (upper left) sliding beam 172 and to a second (lower left) sliding beam 174. The first (upper left) sliding beam 172 and the second (lower left) sliding beam 174 extend inwardly from the first (left) clamp plate 160 towards the right (when facing the front). The first (upper left) sliding beam 172 is slidingly inserted into the first guide channel 104 (the uppermost of the upper guide channels) and the second (lower left) sliding beam 174 is slidingly inserted into the fourth guide channel 110 (the uppermost of the lower guide channels). The first (left) clamp arm 166 has an actuator bracket 132 coupled to the first (left) clamp arm bracket 120 and coupled to the first clamp actuator 134. The first (left) clamp arm 166 has one inner sliding beam stop 115 and one outer sliding beam stop 116 on the first (upper left) sliding beam 172 and one inner sliding beam stop 115 and one outer sliding beam stop 116 on the second (lower left) sliding beam 174. The sliding beam stops 115, 116 of the first (left) clamp arm 166 are configured to engage with the center sliding beam stop 117 on the third (center) clamp arm 170 to control movement of the third (center) clamp arm 170. In some embodiments, the sliding beam stops 115, 116 on the first (upper left) sliding beam 172 may be omitted or the two sliding beam stops 115, 116 on the second (lower left) sliding beam 174 may be omitted. This will save cost, but result in asymmetrical forces being applied to the third (center) clamp arm 170, which may cause the fifth sliding beam 180 and/or sixth sliding beam 182 to bind in their guide channels 106, 112.

The second (right) clamp arm 168 comprises a second (right) clamp plate 162 coupled via a second (right) clamp arm bracket 122 to a third (upper right) sliding beam 176 and to a fourth (lower right) sliding beam 178. The third (upper right) sliding beam 176 and the fourth (lower right) sliding beam 178 extend inwardly from the second (right) clamp plate 162 towards the left (from the driver's perspective). The third (upper right) sliding beam 176 is slidingly inserted into the third guide channel 108 (the lowermost of the upper guide channels) and the fourth (lower right) sliding beam 178 is slidingly inserted into the sixth guide channel 114 (the lowermost of the lower guide channels). The second (right) clamp arm 168 has an actuator bracket 132 coupled to the second (right) clamp arm bracket 122 and coupled to the second clamp actuator 136.

The third (center) clamp arm 170 comprises a third (center) clamp plate 164 coupled to a fifth (center upper) sliding beam 180 and a sixth (center lower) sliding beam 182. The sliding beams 180, 182 of the third (center) clamp arm 170 extend to the left from a rear of the third (center) clamp plate 164 (when viewed from the driver's perspective). The fifth (center upper) sliding beam 180 is slidingly inserted into the second guide channel 106 (the middle one of the upper guide channels) and the sixth (center lower) sliding beam 182 is slidingly inserted into the fifth guide channel 112 (the middle one of the lower guide channels). The third (center) clamp plate 164 is shown with cut-outs for weight reduction, but they may be omitted in other embodiments. The third (center) clamp arm 170 has a plurality of center sliding beam stops 117, one on the fifth sliding beam 180 and one on the sixth sliding beam 182, though in some embodiments, one of the center sliding beam stops 117 may be omitted. The inner sliding beam stop 115 and the outer sliding beam stop 116 of the first sliding beam 172 are configured to contact the center sliding beam stop 117 of the fifth sliding beam 180 and transmit force thereto as these beams 172, 180 move in their respective guide channels 104, 106. Likewise, the inner sliding beam stop 115 and the outer sliding beam stop 116 of the second sliding beam 174 are configured to contact the center sliding beam stop 117 of the sixth sliding beam 182 and transmit force thereto as these beams 174, 182 move in their respective guide channels 110, 112.

In some alternative embodiments, guide channels 104, 106, 108, 110, 112, 114 may be arranged differently than in the representative embodiment single-double load clamp 100, with the necessary adjustments made to the components of the clamp arms 166, 168, 170. For example, in some embodiments, the first guide channel 104 is the middle of the upper guide channels, the second guide channel 106 is the lower of the upper guide channels, and the third guide channel 108 is the upper of the upper guide channels. Likewise, the fourth guide channel 110 is the middle of the lower guide channels, the fifth guide channel 112 is the lower of the lower guide channels, and the sixth guide channel 114 is the upper of the lower guide channels. The first sliding beam 172 is still slidingly inserted into first guide channel 104, the second sliding beam 174 into the fourth guide channel 110, the third sliding beam 176 into third guide channel 108, the fourth sliding beam 178 into the sixth guide channel 114, the fifth sliding beam 180 into the second guide channel 106 and the sixth sliding beam 182 into the fifth guide channel 112. The coupling of the first sliding beam 172 and second sliding beam 174 with the first clamp plate 160, the coupling of the third sliding beam 176 and fourth sliding beam 178 with the second clamp plate 162, and the coupling of the fifth sliding beam 180 and the sixth sliding beam 182 with the third clamp plate 164 are all shifted to preserve alignment between the first clamp plate 160, the second clamp plate 162 and the third clamp plate 164.

In some alternative embodiments, the first clamp arm 166 is on the right (when viewed from the driver's perspective) with its first sliding beam 172 and its second sliding beam 174 extending inwardly from the first clamp plate 160 towards the left. The second clamp arm 168 is on the left (when viewed from the driver's perspective) with its third sliding beam 176 and the fourth sliding beam 178 extending inwardly from the second clamp plate 162 towards the right. The third clamp arm 170 remains in the center but its sliding beams 180, 182 extend to the right from the rear of the third clamp plate 164 (when viewed from the driver's perspective).

In some alternative embodiments, the third (center) clamp arm 170 is fixed to the frame 102 and remains stationary during clamping operations. In some of such embodiments, the bearings inside the second guide channel 106 and the fifth guide channel 112 maybe omitted. The sliding beam stops 115, 117 maybe omitted as well. In some such embodiments, the second guide channel 106 and the fifth guide channel 112 are themselves are omitted.

In the representative embodiment single-double load clamp 100, the first (left) clamp arm 166 and second (right) clamp arm 168 each have a clamp pad 150 coupled to an inside surface of their clamp plate 160, 162, but the third (center) clamp arm 170 does not have a clamp pad. In some other embodiments one or both of the left and right clamp arms 166, 168 do not have a clamp pad. In some other embodiments, the third (center) clamp arm 170 has a clamp pad on one or both sides of the third (center) clamp plate 164.

In some alternative embodiments, the third (center) clamp arm 170 is fixed to the frame 102.

In some alternative embodiments, the inner sliding beam stops 115, the outer sliding beam stops 116, and the center sliding beam stops 117 are omitted. Instead, a first tension element is coupled to the first clamp arm 166 and to the third clamp arm 170. The first tension element is configured for pulling the third clamp arm 170 away from the second clamp arm 168 when the first clamp arm 166 moves away from the second clamp arm 168. Also, a second tension element is coupled to the second clamp arm 168 and the third clamp arm 170. The second tension element is configured for pulling the third clamp arm 170 towards the second clamp arm 168 when the first clamp arm 166 moves towards the second clamp arm 168. The tension elements are elastic and provide no resistance force in compression.

REPRESENTATIVE EMBODIMENT—OPERATION

Figure 6B:
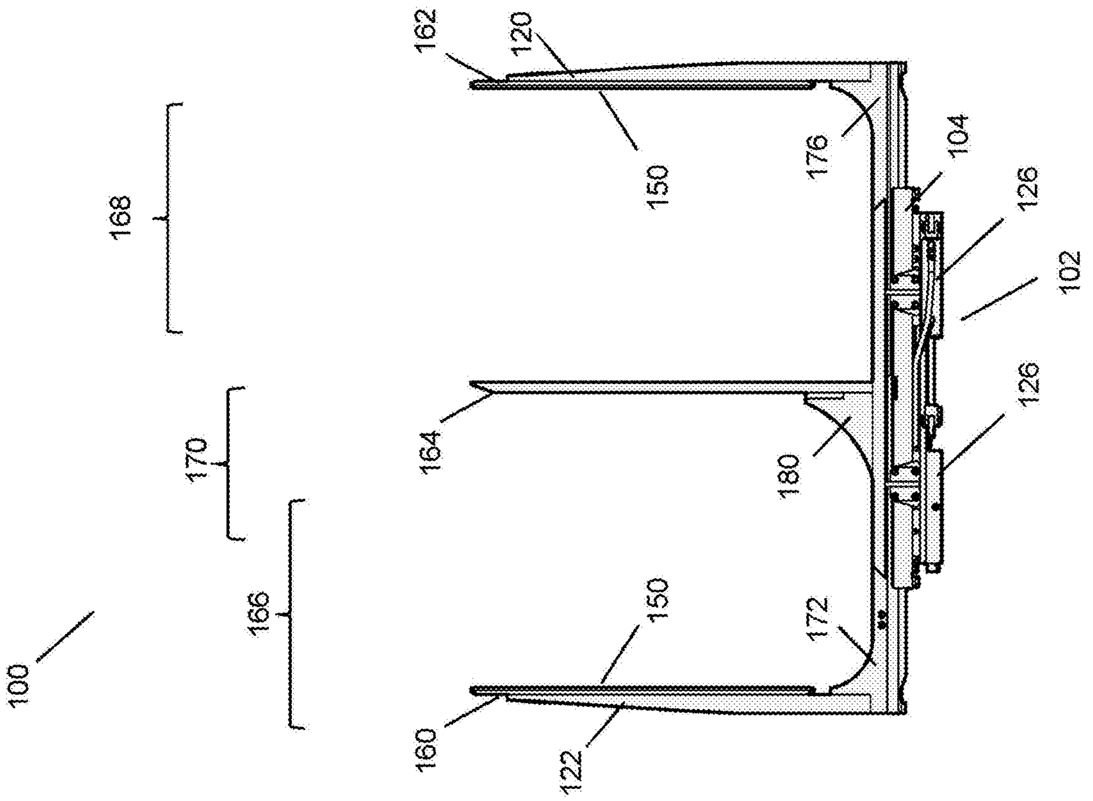
FIG. 6B shows a top view of the single-double load clamp 100 in a double load mode.
Figure 6A:
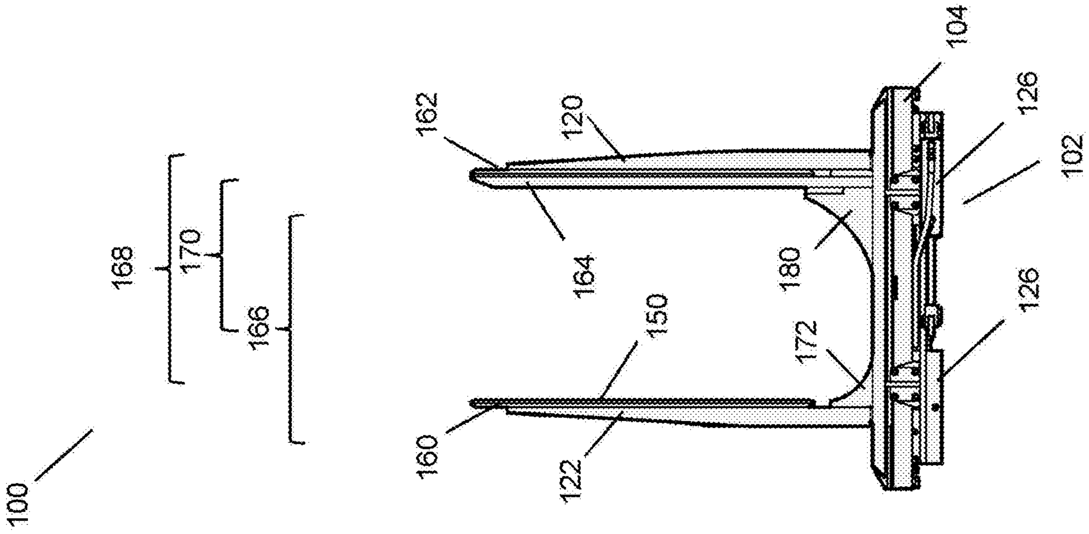
FIG. 6A shows a top view of the single-double load clamp 100 in a single load mode.

FIG. 6A shows a top view of the representative embodiment single-double load clamp 100 in a single load mode. Starting in the single load mode, the third (center) clamp arm 170 is in contact with the second (right) clamp arm 168 with the third (center) clamp plate 164 in contact with second (right) clamp plate 162, either directly or through the clamp pad 150 of the second (right) clamp arm 168. The operator of the lift truck 10 maneuvers the lift truck 10 so that the first (left) clamp plate 160 and the third (center) clamp plate 164 are on either side of a load. The operator then causes the first clamp actuator 134 and the second clamp actuator 136 to pull the first (left) clamp arm 166 and second (right) clamp arm 168 closer together, with the second (right) clamp arm 168 pushing the third (center) clamp arm 170 laterally toward the first (left) clamp arm 166. Eventually, the first and second (left and right) clamp arms 166, 168 are stopped by the load or by the center sliding beam stops 117 of the third (center) clamp arm 170 contacting the outer sliding beam stops 116 of the first (left) clamp arm 166. If stopped by the load, the operator then causes the left and right clamp arms 166, 168 to move toward each other and compress the load enough to grip it, lift it and move it.

To release the load when in single load mode, the first clamp actuator 134 and the second clamp actuator 136 push the left and right clamp arms 166, 168 apart. The third (center) clamp arm 170 will move slightly left (when viewed from the driver's perspective), driven by the load uncompressing when the second (right) clamp plate 162 has ceased putting pressure on the third (center) clamp plate 164. The third (center) clamp arm 170 will then remain stationary as the first (left) clamp arm 166 and second (right) clamp arm 168 move further apart laterally. At some time after this point, the operator can halt the movement of the first (left) clamp arm 166 and second (right) clamp arm 168 and then maneuver the lift truck 10 away from the load.

After the load is released while in single load mode, the operator can continue to move the first (left) clamp arm 166 and second (right) clamp arm 168 further apart laterally, while the third (center) clamp arm 170 remains stationary. A gap opens between the third (center) clamp plate 164 and the second (right) clamp plate 162 and the single-double load clamp 100 enters double load mode. At some time after this point, the operator can halt the movement of the first (left) clamp arm 166 and second (right) clamp arm 168 and then maneuver the lift truck 10 to a double load, positioning one load between the first (left) clamp plate 160 and the third (center) clamp plate 164 and the other load between the third (center) clamp plate 164 and the second (right) clamp plate 162. If the operator continues to move the first (left) clamp arm 166 and second (right) clamp arm 168 outward, eventually the inner sliding beam stops 115 of the first (left) clamp arm 166 contact the center sliding beam stops 117 of the third (center) clamp arm 170 and drag the third (center) clamp arm 170 to the left (when viewed from the driver's perspective). At some point, the first (left) clamp arm 166 and the second (right) clamp arm 168 reach their maximum lateral positions, typically limited by the stroke of the clamp actuators 134, 136 or the length of the sliding beams 172, 174, 176, 178. The single-double load clamp 100 is now in fully open double load mode, as shown in FIG. 6B.

After the lift truck 10 has maneuvered to position one load between the first (left) clamp plate 160 and the third (center) clamp plate 164 and the other load between the third (center) clamp plate 164 and the second (right) clamp plate 162, the operator causes the first clamp actuator 134 and the second clamp actuator 136 to pull the first (left) clamp arm 166 and second (right) clamp arm 168 closer together. If the left and right clamp arms 166, 168 encounter the double loads, they compress the loads enough to grip them, lift them and move them.

If the left and right clamp arms 166, 168 do not encounter any loads, the outer sliding beam stops 116 of the first (left) clamp arm 166 contact the center sliding beam stops 117 on the third (center) clamp arm 170 and push the third (center) clamp arm 170 to the right (when viewed from the driver's perspective). Eventually the third (center) clamp plate 164 contacts the second (right) clamp plate 162, the third (center) clamp arm 170 stops moving and the first (left) clamp plate 160 stops moving. The single-double load clamp 100 is now back in single load mode as shown in FIG. 6A.

If the left and right clamp arms 166, 168 only encounter a load between the first (left) clamp plate 160 and the third (center) clamp plate 164, the first (left) clamp arm 166 applies force through the load and pushes the third (center) clamp arm 170 to the right (when viewed from the driver's perspective). Eventually the third (center) clamp plate 164 contacts the second (right) clamp plate 162, the third (center) clamp arm 170 stops moving and the first (left) clamp plate 160 stops moving. The single-double load clamp 100 is now back in single load mode as shown in FIG. 6A, but with a load between the first (left) clamp plate 160 and the third (center) clamp plate 164.

In some alternative embodiments, the first clamp arm 166 moves when in single mode, but the second clamp arm 168 remains stationary.

What is claimed is:

1. A load handler for a lift truck comprising:

a frame;

a first clamp arm with a first clamp arm sliding beam slidingly coupled to the frame, wherein the first clamp arm sliding beam has an inner sliding beam stop and an outer sliding beam stop;

a second clamp arm with a second clamp arm sliding beam slidingly coupled to the frame;

a third clamp arm with a third clamp arm sliding beam slidingly coupled to the frame, wherein the third clamp arm sliding beam has a center sliding beam stop;

wherein the inner sliding beam stop is configured for contacting the center sliding beam stop then pulling the third clamp arm away from the second clamp arm when the first clamp arm moves away from the second clamp arm; and wherein the outer sliding beam stop is configured for contacting the center sliding beam stop then pushing the third clamp arm toward the second clamp arm when the first clamp arm moves toward the second clamp arm.

2. The load handler of claim 1, further comprising:

a first clamp actuator coupled to the frame and to the first clamp arm;

a second clamp actuator coupled to the frame and to the second clamp arm;

wherein the first and second clamp actuators are configured for moving the first and second clamp arms laterally towards each other; and wherein the first and second clamp actuators are configured for moving the first and second clamp arms laterally away from each other.

3. The load handler of claim 1, wherein the frame is configured for attaching to the lift truck.

4. The load handler of claim 1, wherein the frame has a plurality of guide channels; and wherein the sliding beams are each slidingly inserted in one of the plurality of guide channels.

5. The load handler of claim 1, further comprising:

a first sliding beam guide channel coupled to the frame with the first clamp arm sliding beam slidingly inserted in the first sliding beam guide channel;

a second sliding beam guide channel coupled to the frame with the second clamp arm sliding beam slidingly inserted in the first sliding beam guide channel; and a third sliding beam guide channel coupled to the frame with the third clamp arm sliding beam slidingly inserted in the first sliding beam guide channel.

6. The load handler of claim 5, further comprising:
wherein the first sliding beam guide channel is positioned above the third sliding beam guide channel;
wherein the third sliding beam guide channel is positioned above the second sliding beam guide channel;
wherein the inner sliding beam stop and the outer sliding beam stop are coupled to a bottom of the first clamp arm sliding beam; and
wherein the center sliding beam stop is coupled to a top of the third clamp arm sliding beam and positioned between the inner sliding beam stop and the outer sliding beam stop.

7. The load handler of claim 5, further comprising:
wherein the second sliding beam guide channel is positioned above the third sliding beam guide channel;
wherein the third sliding beam guide channel is positioned above the first sliding beam guide channel;
wherein the inner sliding beam stop and the outer sliding beam stop are coupled to a top of the first clamp arm sliding beam; and
wherein the center sliding beam stop is coupled to a bottom of the third clamp arm sliding beam and positioned between the inner sliding beam stop and the outer sliding beam stop.

8. The load handler of claim 1, further comprising:
a first clamp actuator coupled to the frame and to the first clamp arm;
a second clamp actuator coupled to the frame and to the second clamp arm;
wherein the first and second clamp actuators are configured for moving the first and second clamp arms laterally towards each other;
wherein the first and second clamp actuators are configured for moving the first and second clamp arms laterally away from each other;
wherein the frame is configured for attaching to the lift truck;
wherein the frame has a plurality of guide channels;
wherein the sliding beams are each slidingly inserted in one of the plurality of guide channels;
a first sliding beam guide channel coupled to the frame with the first clamp arm sliding beam slidingly inserted in the first sliding beam guide channel;
a second sliding beam guide channel coupled to the frame with the second clamp arm sliding beam slidingly inserted in the first sliding beam guide channel;
a third sliding beam guide channel coupled to the frame with the third clamp arm sliding beam slidingly inserted in the first sliding beam guide channel;
wherein the first sliding beam guide channel is positioned above the third sliding beam guide channel;
wherein the third sliding beam guide channel is positioned above the second sliding beam guide channel;
wherein the inner sliding beam stop and the outer sliding beam stop are coupled to a bottom of the first clamp arm sliding beam; and
wherein the center sliding beam stop is coupled to a top of the third clamp arm sliding beam and positioned between the inner sliding beam stop and the outer sliding beam stop.

9. A load handler for a lift truck comprising:
a frame with a plurality of guide channels;
a plurality of sliding beams, each slidingly inserted in one of the plurality of guide channels;
a first clamp arm with a first clamp plate coupled with at least one of the plurality of sliding beams having an inner sliding beam stop and an outer sliding beam stop;
a second clamp arm with a second clamp plate coupled with at least one of the plurality of sliding beams;
a third clamp arm with a third clamp plate with at least one of the plurality of sliding beams having a center sliding beam stop;
wherein the inner sliding beam stop is configured for contacting the center sliding beam stop then pulling the third clamp arm away from the second clamp arm when the first clamp arm moves away from the second clamp arm; and
wherein the outer sliding beam stop is configured for contacting the center sliding beam stops then pushing the third clamp arm toward the second clamp arm when the first clamp arm moves toward the second clamp arm.

10. The load handler of claim 9,
wherein the frame is configured for attaching to the lift truck.

11. The load handler of claim 9,
a first clamp actuator coupled to the frame and to the first clamp arm;
a second clamp actuator coupled to the frame and to the second clamp arm;
wherein the first and second clamp actuators are configured for moving the first and second clamp arms laterally towards each other; and
wherein the first and second clamp actuators are configured for moving the first and second clamp arms laterally away from each other.

12. The load handler of claim 9,
wherein the plurality of guide channels includes a first guide channel, a second guide channel, a third guide channel, a fourth guide channel, a fifth guide channel, and a sixth guide channel;
wherein the first clamp arm includes a first sliding beam and a second sliding beam, the first sliding beam slidingly inserted in the first guide channel, the second sliding beam slidingly inserted in the fourth guide channel;
wherein the second clamp arm includes a third sliding beam and a fourth sliding beam, the third sliding beam slidingly inserted in the third guide channel, the fourth sliding beam slidingly inserted in the sixth guide channel; and
wherein the third clamp arm includes a fifth sliding beam and a sixth sliding beam, the fifth sliding beam slidingly inserted in the second guide channel, the sixth sliding beam slidingly inserted in the fifth guide channel.

13. The load handler of claim 12,
wherein the first guide channel is positioned above the second guide channel;
wherein the second guide channel is positioned above the third guide channel;
wherein the third guide channel is positioned above the fourth guide channel;
wherein the fourth guide channel is positioned above the fifth guide channel;
wherein the fifth guide channel is positioned above the sixth guide channel;
wherein a first of the inner sliding beam stops and a first of the outer sliding beam stops are coupled to a bottom of the first sliding beam;
wherein a first of the center sliding beam stops is coupled to a top of the fifth sliding beam and positioned between the first inner sliding beam stop and the first outer sliding beam stop;

wherein a second of the inner sliding beam stops and a second of the outer sliding beam stops are coupled to a bottom of the second sliding beam; and wherein a second of the center sliding beam stops is coupled to a top of the sixth sliding beam and positioned between the second inner sliding beam stop and the second outer sliding beam stop.

14. The load handler of claim 12, wherein the third guide channel is positioned above the second guide channel;

wherein the second guide channel is positioned above the first guide channel;

wherein the first guide channel is positioned above the sixth guide channel;

wherein the sixth guide channel is positioned above the fifth guide channel;

wherein the fifth guide channel is positioned above the fourth guide channel;

wherein a first of the inner sliding beam stops and a first of the outer sliding beam stops are coupled to a top of the first sliding beam;

wherein a first of the center sliding beam stops is coupled to a bottom of the fifth sliding beam and positioned between the first inner sliding beam stop and the first outer sliding beam stop;

wherein a second of the inner sliding beam stops and a second of the outer sliding beam stops are coupled to a top of the second sliding beam; and wherein a second of the center sliding beam stops is coupled to a bottom of the sixth sliding beam and positioned between the second inner sliding beam stop and the second outer sliding beam stop.

15. The load handler of claim 9, further comprising:

a first clamp actuator coupled to the frame and to the first clamp arm;

a second clamp actuator coupled to the frame and to the second clamp arm;

wherein the first and second clamp actuators are configured for moving the first and second clamp arms laterally towards each other;

wherein the first and second clamp actuators are configured for moving the first and second clamp arms laterally away from each other;

wherein the frame is configured for attaching to the lift truck;

wherein the plurality of guide channels includes a first guide channel, a second guide channel, a third guide channel, a fourth guide channel, a fifth guide channel, and a sixth guide channel;

wherein the first clamp arm includes a first sliding beam and a second sliding beam, the first sliding beam slidingly inserted in the first guide channel, the second sliding beam slidingly inserted in the fourth guide channel;

wherein the second clamp arm includes a third sliding beam and a fourth sliding beam, the third sliding beam slidingly inserted in the third guide channel, the fourth sliding beam slidingly inserted in the sixth guide channel;

wherein the third clamp arm includes a fifth sliding beam and a sixth sliding beam, the fifth sliding beam slidingly inserted in the second guide channel, the sixth sliding beam slidingly inserted in the fifth guide channel;

wherein the first guide channel is positioned above the second guide channel;

wherein the second guide channel is positioned above the third guide channel;

wherein the third guide channel is positioned above the fourth guide channel;

wherein the fourth guide channel is positioned above the fifth guide channel;

wherein the fifth guide channel is positioned above the sixth guide channel;

wherein a first of the inner sliding beam stops and a first of the outer sliding beam stops are coupled to a bottom of the first sliding beam;

wherein a first of the center sliding beam stops is coupled to a top of the fifth sliding beam and positioned between the first inner sliding beam stop and the first outer sliding beam stop;

wherein a second of the inner sliding beam stops and a second of the outer sliding beam stops are coupled to a bottom of the second sliding beam; and wherein a second of the center sliding beam stops is coupled to a top of the sixth sliding beam and positioned between the second inner sliding beam stop and the second outer sliding beam stop.

16. A load handler for a lift truck comprising:

a frame;

a first clamp arm with first clamp plate coupled to a first clamp arm sliding beam slidingly coupled to the frame, wherein the first clamp arm sliding beam has an inner sliding beam stop and an outer sliding beam stop;

a second clamp arm fixed to the frame;

a third clamp arm with third clamp plate coupled to a third clamp arm sliding beam slidingly coupled to the frame, wherein the third clamp arm sliding beam has a center sliding beam stop;

wherein the inner sliding beam stop is configured for contacting the center sliding beam stop then pulling the third clamp arm away from the second clamp arm when the first clamp arm moves away from the second clamp arm; and wherein the outer sliding beam stop is configured for contacting the center sliding beam stop then pushing the third clamp arm toward the second clamp arm when the first clamp arm moves toward the second clamp arm.

17. The load handler of claim 16, wherein the frame is configured for attaching to the lift truck.

18. The load handler of claim 17, a clamp actuator coupled to the frame and to the first clamp arm;

wherein the clamp actuator is configured for moving the first clamp arm laterally towards the second clamp arm; and wherein the clamp actuator is configured for moving the first clamp arm laterally away from the second clamp arm.

19. The load handler of claim 18, further comprising:

wherein the first clamp arm sliding beam is positioned above the third clamp arm sliding beam:

wherein the inner sliding beam stop and the outer sliding beam stop are coupled to a bottom of the first clamp arm sliding beam; and wherein the center sliding beam stop is coupled to a top of the third clamp arm sliding beam and positioned between the inner sliding beam stop and the outer sliding beam stop.

20. The load handler of claim 18, further comprising:

wherein the third clamp arm sliding beam is positioned above the first clamp arm sliding beam:

wherein the inner sliding beam stop and the outer sliding beam stop are coupled to a top of the first clamp arm sliding beam; and wherein the center sliding beam stop is coupled to a bottom of the third clamp arm sliding beam and positioned between the inner sliding beam stop and the outer sliding beam stop.

21. A load handler for a lift truck comprising:

a frame;

a first clamp arm with a first clamp plate coupled to a first clamp arm sliding beam slidingly coupled to the frame;

a second clamp arm with a second clamp plate coupled to a second clamp arm sliding beam slidingly coupled to the frame;

a third clamp arm fixed to the frame;

a first clamp actuator coupled to the frame and to the first clamp arm;

a second clamp actuator coupled to the frame and to the second clamp arm;

wherein the first and second clamp actuators are configured for moving the first and second clamp arms laterally towards each other; and wherein the first and second clamp actuators are configured for moving the first and second clamp arms laterally away from each other.

22. A load handler for a lift truck comprising:

a frame;

a first clamp arm with a first clamp arm sliding beam slidingly coupled to the frame;

a second clamp arm with a second clamp arm sliding beam slidingly coupled to the frame;

a third clamp arm with a third clamp arm sliding beam slidingly coupled to the frame;

a first tension element coupled to the first clamp arm and to the third clamp arm, wherein the first tension element is configured for pulling the third clamp arm away from the second clamp arm when the first clamp arm moves away from the second clamp arm; and a second tension element coupled to the second clamp arm and to the third clamp arm, wherein the second tension element is configured for pulling the third clamp arm towards the second clamp arm when the first clamp arm moves towards the second clamp arm.

23. The load handler of claim 22, further comprising:

a first clamp actuator coupled to the frame and to the first clamp arm;

a second clamp actuator coupled to the frame and to the second clamp arm;

wherein the first and second clamp actuators are configured for moving the first and second clamp arms laterally towards each other; and wherein the first and second clamp actuators are configured for moving the first and second clamp arms laterally away from each other.

* * * * *